United States Patent
Atluri et al.

(10) Patent No.: US 11,938,839 B2
(45) Date of Patent: Mar. 26, 2024

(54) VEHICLE PROPULSION WITH MULTIPLE BATTERY PACKS

(71) Applicant: GM Global Technology Operations LLC, Detroit, MI (US)

(72) Inventors: Venkata Prasad Atluri, Novi, MI (US); Chinmaya Patil, South Lyon, MI (US); Norman K. Bucknor, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 52 days.

(21) Appl. No.: 17/834,465

(22) Filed: Jun. 7, 2022

(65) Prior Publication Data

US 2023/0391227 A1 Dec. 7, 2023

(51) Int. Cl.
| | |
|---|---|
| *B60L 58/18* | (2019.01) |
| *B60L 53/60* | (2019.01) |
| *B60L 58/12* | (2019.01) |
| *B60L 58/26* | (2019.01) |

(52) U.S. Cl.
CPC ............... *B60L 58/18* (2019.02); *B60L 53/60* (2019.02); *B60L 58/12* (2019.02); *B60L 58/26* (2019.02); *B60L 2200/36* (2013.01); *B60L 2210/10* (2013.01)

(58) Field of Classification Search
USPC ...................................................... 307/10.1
See application file for complete search history.

(56) References Cited

U.S. PATENT DOCUMENTS

| | | | | |
|---|---|---|---|---|
| 2020/0406777 | A1* | 12/2020 | Nguyen | B60L 53/35 |
| 2021/0384564 | A1* | 12/2021 | Rogers | H01M 10/486 |
| 2022/0209544 | A1* | 6/2022 | Kim | H02J 7/007 |
| 2023/0035894 | A1* | 2/2023 | Petrakivskyi | H02J 7/0029 |

\* cited by examiner

*Primary Examiner* — Rexford N Barnie
*Assistant Examiner* — Xuan Ly
(74) *Attorney, Agent, or Firm* — CANTOR COLBURN LLP

(57) ABSTRACT

A system in a vehicle includes two or more smart battery packs to power drive units of the vehicle to move the vehicle. Each of the two or more smart battery packs includes a battery pack, and a battery management system (BMS) to monitor a state of charge of the battery pack. An energy distribution unit facilitates charge transfer among the two or more smart battery packs.

20 Claims, 3 Drawing Sheets

VEHICLE PROPULSION WITH MULTIPLE BATTERY PACKS

The subject disclosure relates to vehicle propulsion with multiple battery packs.

An electric or hybrid vehicle (e.g., automobile, truck, construction equipment, farm equipment, automated factory equipment) generally includes a battery pack that powers the propulsion of the vehicle. Some vehicles, such as Class 7 or Class 8 vehicles, which exceed 26,001 pounds, may include purpose-built energy storage systems to meet their power, energy, and fast charging requirements. A purpose-built architecture may be expensive and inefficient, because it does not allow for reuse across multiple vehicle types. Accordingly, it is desirable to provide vehicle propulsion with multiple battery packs.

SUMMARY

In one exemplary embodiment, a system in a vehicle includes two or more smart battery packs to power drive units of the vehicle to move the vehicle. Each of the two or more smart battery packs includes a battery pack, and a battery management system (BMS) to monitor a state of charge of the battery pack. An energy distribution unit facilitates charge transfer among the two or more smart battery packs.

In addition to one or more of the features described herein, the battery pack of each of the two or more smart battery packs drives a corresponding one of the drive units of the vehicle.

In addition to one or more of the features described herein, the battery pack of each of the two or more smart battery packs is connected to a port configured to connect to a corresponding port of a direct current fast charger.

In addition to one or more of the features described herein, the battery pack of each of the two or more smart battery packs is connected to the port via a cooling circuit.

In addition to one or more of the features described herein, the system also includes an isolating switch to be controlled to connect or disconnect two of the two or more smart battery packs.

In addition to one or more of the features described herein, the isolating switch is controlled to connect the battery pack of each of the two of the two or more smart battery packs in parallel to a same port that is configured to connect to a direct current fast charger.

In addition to one or more of the features described herein, the isolating switch is controlled to connect the battery pack of each of the two of the two or more smart battery packs in parallel to a same one of the drive units.

In addition to one or more of the features described herein, the energy distribution unit includes two or more switches. Each of the two or more switches corresponds with one of the two or more smart battery packs. The energy distribution unit also includes a direct current (DC)-DC converter.

In addition to one or more of the features described herein, two of the two or more switches are controlled to be closed to connect corresponding two of the two or more smart battery packs in series via the DC-DC converter for power transfer from one of the two of the two or more smart battery packs to another of the two of the two or more smart battery packs through the DC-DC converter.

In addition to one or more of the features described herein, the DC-DC converter regulates voltage and manages energy transfer between the one of the two of the two or more smart battery packs and the other of the two of the two or more smart battery packs.

In another exemplary embodiment, a method of assembling a system in a vehicle includes arranging two or more smart battery packs to power drive units of the vehicle to move the vehicle, including a battery pack in each of the two or more smart battery packs, and configuring a battery management system (BMS) in each of the two or more smart battery packs to monitor a state of charge of the battery pack. The method also includes configuring an energy distribution unit to facilitate charge transfer among the two or more smart battery packs.

In addition to one or more of the features described herein, the including the battery pack of each of the two or more smart battery packs includes arranging the battery pack to drive a corresponding one of the drive units of the vehicle.

In addition to one or more of the features described herein, the including the battery pack of each of the two or more smart battery packs includes connecting the battery pack to a port configured to connect to a corresponding port of a direct current fast charger.

In addition to one or more of the features described herein, the connecting the battery pack of each of the two or more smart battery packs to the port is via a cooling circuit.

In addition to one or more of the features described herein, the method also includes arranging an isolating switch to be controlled to connect or disconnect two of the two or more smart battery packs.

In addition to one or more of the features described herein, the arranging the isolating switch includes configuring the isolating switch to be controlled to connect the battery pack of each of the two of the two or more smart battery packs in parallel to a same port that is configured to connect to a direct current fast charger.

In addition to one or more of the features described herein, the arranging the isolating switch includes configuring the isolating switch to be controlled to connect the battery pack of each of the two of the two or more smart battery packs in parallel to a same one of the drive units.

In addition to one or more of the features described herein, the configuring the energy distribution unit includes arranging two or more switches, each of the two or more switches corresponding with one of the two or more smart battery packs, and a direct current (DC)-DC converter.

In addition to one or more of the features described herein, the arranging the two or more switches includes configuring two of the two or more switches to be controlled to be closed to connect corresponding two of the two or more smart battery packs in series via the DC-DC converter for power transfer from one of the two of the two or more smart battery packs to another of the two of the two or more smart battery packs through the DC-DC converter.

In addition to one or more of the features described herein, the arranging the DC-DC converter includes the DC-DC regulator regulating voltage and managing energy transfer between the one of the two of the two or more smart battery packs and the other of the two of the two or more smart battery packs.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
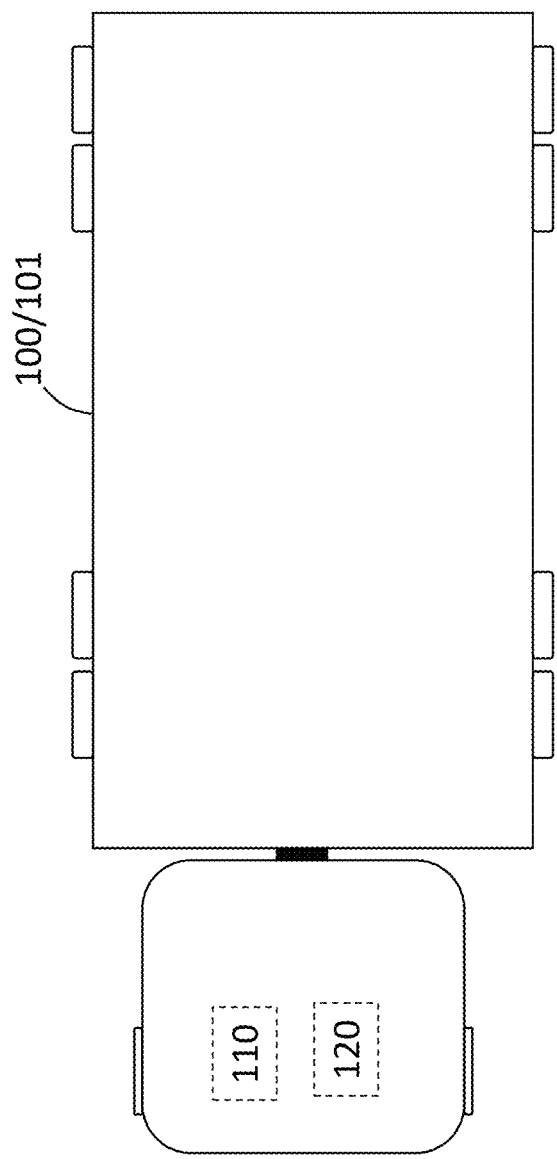
FIG. 1 is a block diagram of a vehicle that implements propulsion with multiple battery packs according to one or more embodiments.

The following description is merely exemplary in nature and is not intended to limit the present disclosure, its application or uses. It should be understood that throughout the drawings, corresponding reference numerals indicate like or corresponding parts and features.

As previously noted, some vehicles (e.g., Class 7, Class 8) have particularly challenging power, energy, and fast charging requirements. As a result, prior approaches have involved a purpose-built energy storage architecture for these vehicles, which may be an expensive and inefficient solution. Embodiments of the systems and methods detailed herein relate to vehicle propulsion with multiple battery packs. A battery pack refers to a plurality of batteries or battery cells that are managed by a battery management system (BMS). The battery pack and associated BMS may be referred to together as a smart battery pack. The multiple battery packs provide a scalable and flexible energy storage approach. Multiple relays are connected to a liquid-cooled direct current (DC)-DC converter to facilitate pack-to-pack energy transfer. Liquid-cooled parallel charging ports enable extreme fast charging on the order of a megawatt (MW).

Figure 2:
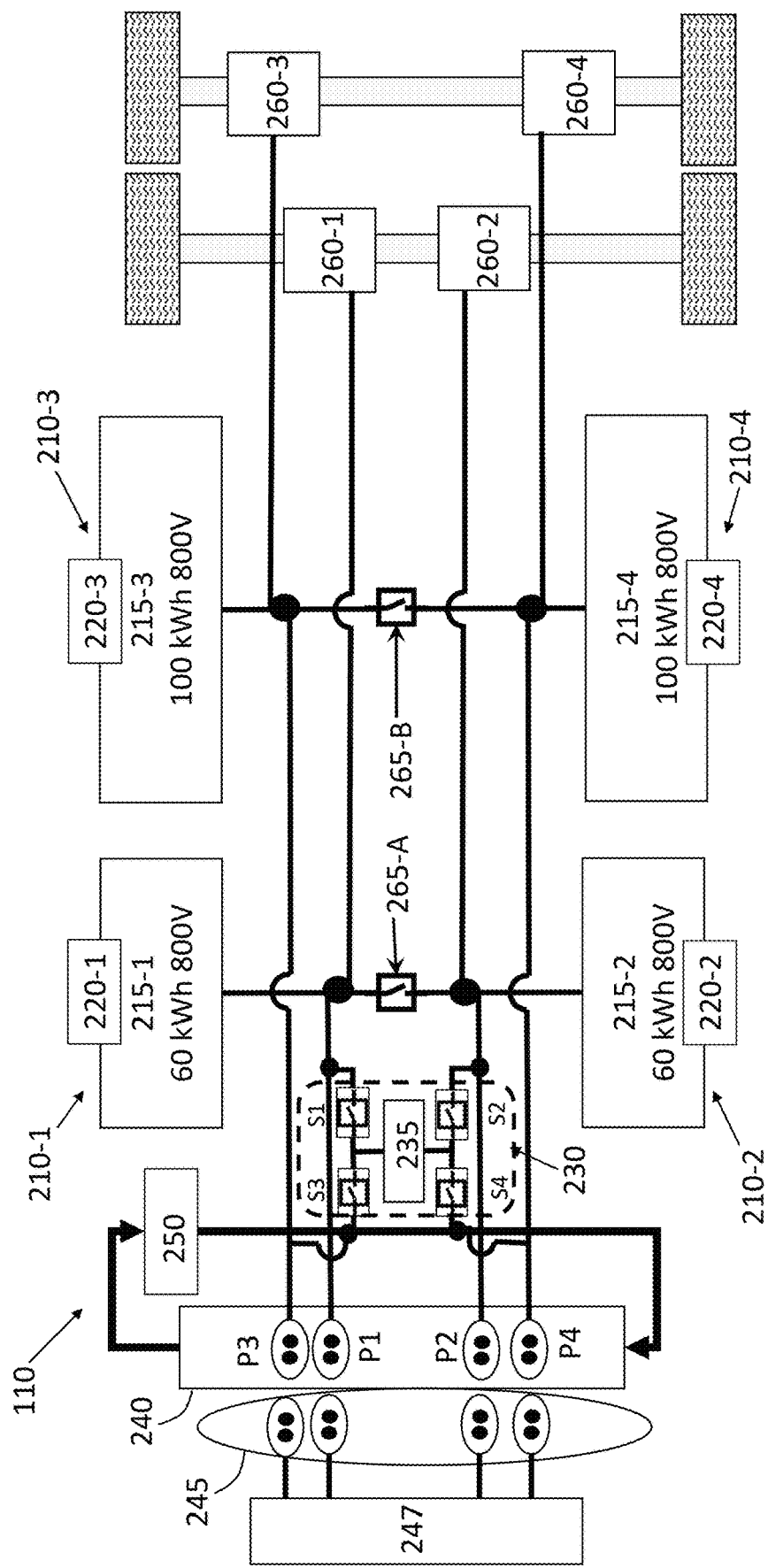
FIG. 2 is a block diagram detailing an exemplary propulsion system according to one or more embodiments.

In accordance with an exemplary embodiment, FIG. 1 is a block diagram of a vehicle 100 that implements propulsion with multiple battery packs 215 (FIG. 2). The exemplary vehicle 100 shown in FIG. 1 is a truck 101 (e.g., a Class 7 truck). As previously noted, a propulsion system 110 with multiple battery packs 215 may be most helpful for higher weight vehicles 100 (e.g., Class 7 or Class 8) that have higher energy demands. However, the propulsion system 110 according to one or more embodiments may be implemented in any type of vehicle 100. The propulsion system 110 is further detailed with reference to FIG. 2. The vehicle 100 also includes a controller 120.

The controller 120 may control various aspects of the propulsion system 110, as noted in the discussion of FIG. 2, and may additionally control various aspects of vehicle operation, as well. The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 120 may also include a non-transitory computer-readable medium that stores instructions which are processed by one or more processors of the controller 120 to implement the processes discussed with reference to FIG. 3.

FIG. 2 is a block diagram detailing an exemplary propulsion system 110 according to one or more embodiments. The exemplary propulsion system 110 includes four smart battery packs 210-1, 210-2, 210-3, 210-4 (generally referred to as 210) but alternate embodiments may include two or more smart battery packs 210. The smart battery packs 210 include corresponding battery packs 215-1, 215-2, 215-3, 215-4 (generally referred to as 215) and their BMSs 220-1, 220-2, 220-3, 220-4 (generally referred to as 220). The BMS 220 of a smart battery pack 210 may monitor the state of charge of the battery pack 215 of the smart battery pack 210 and communicate the information to the controller 120, for example. As indicated, the smart battery packs 210 may not be identical. In FIG. 2, exemplary battery packs 215-1 and 215-2 are indicated as having an energy storage capacity of 60 kilowatt hours (kWh) at 800 volts (V) while exemplary battery packs 215-3 and 215-4 are shown to have an energy storage capacity of 100 kWh at 800 V.

The battery packs 215 are charged via corresponding ports 240 labeled as P1, P2, P3, P4, each of which couples to one of a set of external ports 245 of a DC fast charger (DCFC) 247, for example. A cooling circuit 250 may be included between the battery packs 215 and ports 240 to provide on-board cooling of the battery packs 215. The controller 120 may control the flow of coolant in the cooling circuit 250. Isolating switches 265-A and 265-B (generally referred to as 265) are shown between battery packs 215-1 and 215-2 and between battery packs 215-3 and 215-4, respectively.

In alternate propulsion systems 110, there may be more battery packs 215 and additional isolating switches 265. These isolating switches 265-A and 265-B are kept open (i.e., the battery packs 215 are kept electrically isolated) during normal operating modes in which each battery pack 215 is charged or used individually. Energy stored in the battery packs 215 may be used to drive corresponding drive units 260-1, 260-2, 260-3, 260-4 (generally referred to as 260) that ultimately translate the energy to movement of the wheels of the vehicle 100. Each drive unit 260 includes a motor and inverter. According to one or more embodiments, the propulsion system 110 also includes an energy distribution unit 230.

The energy distribution unit 230 includes switches S1, S2, S3, S4 and a bi-directional DC-DC converter 235. The energy distribution unit 230 facilitates charging (i.e., energy transfer) among the battery packs 215. As further discussed, this energy transfer among battery packs 215 may be used for rebalancing charge among the battery packs 215. The energy distribution unit 230 may also be used to perform voltage equalization such that all the cells within a battery pack 215 have similar voltage levels. Based on the particular vehicle 100, the energy distribution unit 230 may be a high voltage energy distribution unit (HVEDU) with a 200 kW DC-DC converter 235, for example. Although not shown for readability, the controller 120 may be coupled to the cooling circuit 250, energy distribution unit 230, each of the BMSs 220, the isolating switches 265-A, 265-B, and each of the drive units 260.

While all of the switches S1, S2, S3, S4 and isolating switches 265-A and 265-B are shown in the open position in FIG. 2 for illustrative purposes, each of the switches S1, S2, S3, S4 and isolating switches 265-A and 265-B may be controlled to be closed, as needed. The various modes facilitated by control of the switches S1, S2, S3, S4 and isolating switches 265-A and 265-B by the controller 120 are discussed in turn with reference to Table 1. The modes may be initiated by the controller 120 based on information from the BMSs 220, for example. Table 1 is not an exhaustive list of modes but, rather, a set of examples intended to illustrate the flexibility of the propulsion system 110 according to one or more embodiments.

When each of the battery packs 215 is charged via a corresponding port 245 of the DCFC 247 (i.e., the propulsion system 110 is in a fast (individual) charging mode), all of the switches S1-S4, 265-A, and 265-B are open, as indicated in Table 1. Further, each of the ports 240 labeled as P1, P2, P3, P4 is connected to a corresponding port 245 of the DCFC 247. Thus, for example, the battery pack 215-1, which is connected to the port 240 labeled as P1, is coupled to a port 245 of the DCFC 247 via the port 240 labeled as P1 (i.e., the port 240 labeled as P1 is plugged into a port 245 of the DCFC 247). A similar arrangement is implemented for each of the battery packs 215 individually.

In an alternate charging mode, more than one battery pack 215 may be charged via the same coupling of ports 240, 245. This mode may be initiated by the controller 120 when, for example, one or more of the ports 240 is not connected (i.e., plugged into) a corresponding port 245 of the DCFC 247 due to lack of availability of the ports 245. In this case, battery packs 215 may be combined in parallel to connect via the same port 240 to a port 245 of the DCFC 247.

In Table 1, the exemplary combined charging mode involves battery packs 215-1 and 215-2 being charged via port 240 P1 while battery packs 215-3 and 215-4 are charged via individual port pairs 240, 245. In this case, isolating switch 265-A is closed and port 240 P2 is not connected to a port 245 of the DCFC 247. If, alternately or additionally, 265-B were closed, then battery packs 215-3 and 215-4 would be connected in parallel and could be charged together by connecting the port 240 labeled as P3 or as P4 to a corresponding port 245 of the DCFC 247. In further alternate embodiments, When each of the battery packs 215 drives a corresponding drive unit 260 (i.e., the propulsion system 110 is in a (individual) drive mode), the controller 120 controls all the switches S1 to S4, 265-A, and 265-B to be open, as indicated in Table 1. Thus, for example, battery pack 215-1, which is connected to drive unit 260-1, powers drive unit 260-1. Similarly, each of the battery packs 215 individually drives the drive unit 260 to which it is connected.

In an alternate driving mode, more than one battery pack 215 may power each drive unit 260. This mode may be initiated by the controller 120 when, for example, the state of charge of one of the battery packs 215 is insufficient to drive a corresponding drive unit 260 individually. In this case, battery packs 215 may be combined in parallel to connect to the same one or more drive units 260. In Table 1, the exemplary combined driving mode involves battery packs 215-1 and 215-2 powering both drive units 260-1 and 260-2 in parallel and the battery packs 215-3 and 215-4 powering both drive units 260-3 and 260-4 in parallel.

In this case, both isolating switches 265-A and 265-B are closed. Closing the isolating switch 265-A connects the battery packs 215-1 and 215-2 in parallel while the controller 120 closing the isolating switch 265-B connects the battery packs 215-3 and 215-4 in parallel. If, alternately, only one pair of battery packs 215 were used in combination, the isolating switch 265-A or 265-B associated with the other pair of battery packs 215 would remain open. As the discussion of the alternate charging mode and the alternate driving mode indicates, the isolating switches 265-A and 265-B may be controlled to switch between single-pack (i.e., individual charging/usage of battery packs 215) and multi-pack (i.e., charging/usage of combination of battery packs 215) configurations.

As previously noted, the propulsion system 110 according to one or more embodiments also facilitates charging or charge balancing among battery packs 215. This mode may be initiated by the controller 120 when the state of charge of a particular battery pack 215 falls below a pre-defined threshold, for example. In this mode (i.e., inter-pack charging mode), two battery packs 215 may be connected in series via the energy distribution unit 230 to transfer charge from one of the battery packs 215 to the other through the DC-DC converter 235 of the energy distribution unit 230. That is, connecting two battery packs 215 at different voltage levels directly may result in uncontrolled energy transfer. The DC-DC converter 235 regulates voltage between the battery packs and manages power flow by actively balancing energy (i.e., redistributing energy from one battery pack 215 to the other based on state of charge (SoC) of the battery packs 215).

The exemplary inter-pack charging mode in Table 1 pertains to charging the battery pack 215-4 with the battery pack 215-1. Put another way, the charges of the battery packs 215-1 and 215-4 are balanced. In this case, the switches S1 and S4 are closed to connect the battery pack 215-1 to the battery pack 215-4 via the DC-DC converter 235. If, alternately, the battery pack 215-3 were used to charge the battery pack 215-2 (i.e., if the charges of the battery packs 215-2 and 215-3 were to be balanced), then the switches S2 and S3 would be closed to create a path between the battery packs 215-2 and 215-3 via the DC-DC converter 235 of the energy distribution unit 230. Still alternately, if the charges of the battery packs 215-1 and 215-2 were to be balanced, then the switches S1 and S2 would be closed to create a path between the battery packs 215-1 and 215-2 via the DC-DC converter 235 of the energy distribution unit 230.

TABLE 1

Summary of switch positions for exemplary modes of operation of the propulsion system.

| MODE | S1 | S2 | S3 | S4 | 265-A | 265-B |
|---|---|---|---|---|---|---|
| fast individual charging | open | open | open | open | open | open |
| exemplary combined charging | open | open | open | open | closed | open |
| individual drive mode | open | open | open | open | open | open |
| exemplary combined driving | open | open | open | open | closed | closed |
| exemplary inter-pack charging | closed | open | open | closed | open | open |

Figure 3:
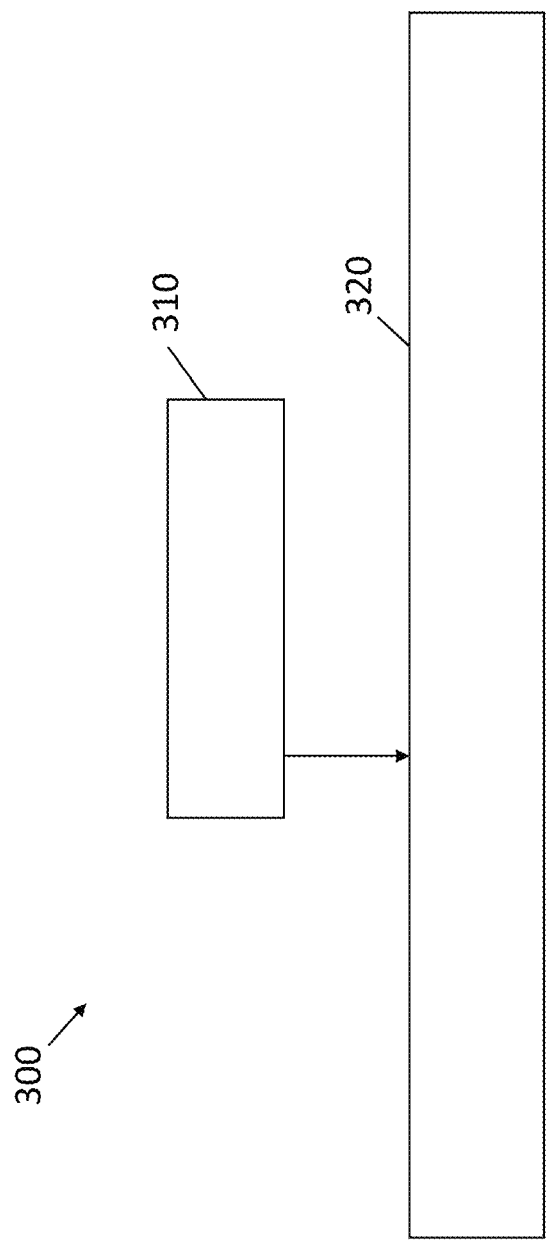
FIG. 3 is a process flow of processes implemented by a controller according to one or more embodiments.

FIG. 3 is a process flow 300 of processes implemented by the controller 120 according to one or more embodiments. At block 310, obtaining information refers to the controller 120 obtaining voltage and charge information from the BMSs 220, for example. The information may indicate or be mapped to modes such as the exemplary modes shown in Table 1. At block 320, the processes include the controller 120 controlling the switches S1 through S4 of the energy distribution unit 230 and the isolating switches 265 according to the information or corresponding mode, as indicated in Table 1, for example.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in a vehicle comprising:
   two or more charging ports, each configured to connect to a corresponding port of a direct current fast charger;
   two or more smart battery packs, each connected to one of the two or more charging ports, configured to power drive units of the vehicle to move the vehicle, each of the two or more smart battery packs comprising:
   a battery pack, and
   a battery management system (BMS) configured to monitor a state of charge of the battery pack; and
   an energy distribution unit configured to facilitate charge transfer among the two or more smart battery packs, wherein the energy distribution unit includes two or more switches, each of the two or more switches corresponding with one of the two or more smart battery packs, and a direct current (DC)-DC converter, and
   wherein two of the two or more switches are controlled to be closed to connect corresponding two of the two or more smart battery packs in series via the DC-DC converter for power transfer from one of the two of the two or more smart battery packs to another of the two of the two or more smart battery packs through the DC-DC converter.

2. The system according to claim 1, wherein the battery pack of each of the two or more smart battery packs drives a corresponding one of the drive units of the vehicle.

3. The system according to claim 1, wherein the battery pack of each of the two or more smart battery packs is connected to the charging port via a cooling circuit.

4. The system according to claim 1, further comprising an isolating switch configured to be controlled to connect or disconnect two of the two or more smart battery packs.

5. The system according to claim 4, wherein the isolating switch is controlled to connect the battery pack of each of the two of the two or more smart battery packs in parallel to a same port that is configured to connect to a direct current fast charger.

6. The system according to claim 4, wherein the isolating switch is controlled to connect the battery pack of each of the two of the two or more smart battery packs in parallel to a same one of the drive units.

7. The system according to claim 1, wherein the DC-DC converter regulates voltage and manages energy transfer between the one of the two of the two or more smart battery packs and the other of the two of the two or more smart battery packs.

8. A method of assembling a system in a vehicle, the method comprising:
   arranging two or more smart battery packs to power drive units of the vehicle to move the vehicle;
   arranging the two or more smart battery packs to each connect to one of two or more charging ports, each configured to connect to a corresponding port of a direct current fast charger;
   including a battery pack in each of the two or more smart battery packs;
   configuring a battery management system (BMS) in each of the two or more smart battery packs to monitor a state of charge of the battery pack; and
   configuring an energy distribution unit to facilitate charge transfer among the two or more smart battery packs, wherein the energy distribution unit includes two or more switches, each of the two or more switches corresponding with one of the two or more smart battery packs, and a direct current (DC)-DC converter, and
   wherein two of the two or more switches are controlled to be closed to connect corresponding two of the two or more smart battery packs in series via the DC-DC converter for power transfer from one of the two of the two or more smart battery packs to another of the two of the two or more smart battery packs through the DC-DC converter.

9. The method according to claim 8, wherein the including the battery pack of each of the two or more smart battery packs includes arranging the battery pack to drive a corresponding one of the drive units of the vehicle.

10. The method according to claim 8, wherein the connecting the battery pack of each of the two or more smart battery packs to the charging port is via a cooling circuit.

11. The method according to claim 8, further comprising arranging an isolating switch to be controlled to connect or disconnect two of the two or more smart battery packs.

12. The method according to claim 11, wherein the arranging the isolating switch includes configuring the isolating switch to be controlled to connect the battery pack of each of the two of the two or more smart battery packs in parallel to a same port that is configured to connect to a direct current fast charger.

13. The method according to claim 11, wherein the arranging the isolating switch includes configuring the isolating switch to be controlled to connect the battery pack of each of the two of the two or more smart battery packs in parallel to a same one of the drive units.

14. The method according to claim 8, wherein the arranging the DC-DC converter includes the DC-DC regulator regulating voltage and managing energy transfer between the one of the two of the two or more smart battery packs and the other of the two of the two or more smart battery packs.

15. A system in a vehicle comprising:
   four charging ports, each configured to connect to a corresponding port of a direct current fast charger;
   four smart battery packs, each connected to one of the four charging ports, configured to power drive units of the vehicle to move the vehicle, each of the four smart battery packs comprising:
   a battery pack, and
   a battery management system (BMS) configured to monitor a state of charge of the battery pack; and
   an energy distribution unit configured to facilitate charge transfer among the four smart battery packs, wherein the energy distribution unit includes four switches, each of the four switches corresponding with one of the four smart battery packs, and a direct current (DC)-DC converter, and
   wherein two of the four switches are controlled to be closed to connect corresponding two of the four smart battery packs in series via the DC-DC converter for power transfer from one of the four smart battery packs to another of the four smart battery packs through the DC-DC converter.

16. The system according to claim 15, wherein the battery pack of each of the four smart battery packs drives a corresponding one of the drive units of the vehicle.

17. The system according to claim 15, wherein the battery pack of each of the four smart battery packs is connected to the charging port via a cooling circuit.

18. The system according to claim 15, further comprising an isolating switch configured to be controlled to connect or disconnect two of the four smart battery packs.

19. The system according to claim 18, wherein the isolating switch is controlled to connect the battery pack of each of the two of the two or more smart battery packs in parallel to a same port that is configured to connect to a direct current fast charger.

20. The system according to claim 18, wherein the isolating switch is controlled to connect the battery pack of each of the two of the four smart battery packs in parallel to a same one of the drive units.

\* \* \* \* \*